United States Patent
Zhang et al.

(10) Patent No.: US 10,205,406 B2
(45) Date of Patent: Feb. 12, 2019

(54) PASSIVE BOOST NETWORK AND DC-DC BOOST CONVERTER APPLYING THE SAME

(71) Applicant: Silergy Semiconductor Technology (Hangzhou) LTD, Hangzhou, ZheJiang Province (CN)

(72) Inventors: Wang Zhang, Hangzhou (CN); Chen Zhao, Hangzhou (CN)

(73) Assignee: Silergy Semiconductor Technology (Hangzhou) LTD, Hangzhou (CN)

(*) Notice: Subject to any disclaimer, the term of this patent is extended or adjusted under 35 U.S.C. 154(b) by 0 days.

(21) Appl. No.: 15/865,420

(22) Filed: Jan. 9, 2018

(65) Prior Publication Data

US 2018/0198382 A1    Jul. 12, 2018

(30) Foreign Application Priority Data

Jan. 12, 2017  (CN) .......................... 2017 1 0028091

(51) Int. Cl.

| | |
|---|---|
| *H02M 7/758* | (2006.01) |
| *H02M 3/315* | (2006.01) |
| *H02M 1/42* | (2007.01) |
| *H02M 3/158* | (2006.01) |
| *H02M 3/335* | (2006.01) |
| *H02M 3/155* | (2006.01) |

(52) U.S. Cl.
CPC ............. *H02M 7/758* (2013.01); *H02M 1/42* (2013.01); *H02M 3/155* (2013.01); *H02M 3/1582* (2013.01); *H02M 3/3155* (2013.01); *H02M 3/335* (2013.01); *H02M 2003/1557* (2013.01)

(58) Field of Classification Search
CPC .......... H02M 3/22; H02M 3/24; H02M 3/325; H02M 3/335; H02M 3/33569; H02M 3/3155; H02M 1/12; H02M 1/4208; H02M 1/4266; H02M 1/126; H02M 7/5387; H02M 7/53871

USPC ........ 363/15, 16, 17, 39, 40, 44, 45, 46, 47, 363/50, 131, 132

See application file for complete search history.

(56) References Cited

U.S. PATENT DOCUMENTS

| | | |
|---|---|---|
| 8,687,382 B2 | 4/2014 | Chen |
| 9,295,116 B2 | 3/2016 | Sanders et al. |
| 9,473,034 B2 | 10/2016 | Huang et al. |
| 9,627,972 B2 | 4/2017 | Mao et al. |
| 9,762,128 B2 | 9/2017 | Zhang et al. |

(Continued)

OTHER PUBLICATIONS

Issa Batarseh, Resonant Converter Topologies with Three and Four Energy Storage Elements, IEEE Transactions on Power Electronics, Jan. 1994, p. 64-73, vol. 9, Issue 1, USA.

*Primary Examiner* — Adolf Berhane
(74) *Attorney, Agent, or Firm* — Michael C. Stephens, Jr.

(57) ABSTRACT

A passive boost network configured to boost and output an AC power signal having a predetermined frequency, can include: an input port; an output port configured to provide the AC power signal; first and second passive components coupled in series between first and second terminals of the input port; a third passive component coupled in series with the second passive component between first and second terminals of the output port; and where the first passive component is one of a capacitor and an inductor, and the second and third passive components are each the other of the capacitor and the inductor.

14 Claims, 11 Drawing Sheets

(56) References Cited

U.S. PATENT DOCUMENTS

| | | | |
|---|---|---|---|
| 9,959,972 B2* | 5/2018 | Lestoquoy | H01F 27/385 |
| 2016/0079888 A1* | 3/2016 | Li | H02P 6/002 |
| | | | 318/400.3 |
| 2016/0099660 A1* | 4/2016 | Khaligh | H02M 1/4241 |
| | | | 363/126 |
| 2017/0237340 A1* | 8/2017 | Long | H02M 1/4258 |
| | | | 307/82 |

* cited by examiner

US 10,205,406 B2

PASSIVE BOOST NETWORK AND DC-DC BOOST CONVERTER APPLYING THE SAME

RELATED APPLICATIONS

This application claims the benefit of Chinese Patent Application No. 201710028091.3, filed on Jan. 12, 2017, which is incorporated herein by reference in its entirety.

FIELD OF THE INVENTION

The present invention generally relates to the field of power electronics, and more particularly to passive boost networks and associated DC-DC boost converters.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

A DC-DC converter is a circuit for regulating a power supply (e.g., an unregulated DC input voltage) to a DC output voltage. In some power supply applications, the voltage is boosted, and the converter design may be difficult when boosting the AC power signal while not using switching converters. In addition, the input port and the output port of the DC-DC converter may be isolated for safety confederations in some applications. Some isolated converters may utilize transformers in order to isolate in a magnetic isolation manner. However, this approach is likely not conducive to power supply miniaturization due to the relatively large transformer core volume.

In one embodiment, a passive boost network configured to boost and output an AC power signal having a predetermined frequency, can include: (i) an input port; (ii) an output port configured to provide the AC power signal; (iii) first and second passive components coupled in series between first and second terminals of the input port; a third passive component coupled in series with the second passive component between first and second terminals of the output port; and (iv) where the first passive component is one of a capacitor and an inductor, and the second and third passive components are each the other of the capacitor and the inductor.

Figure 1:
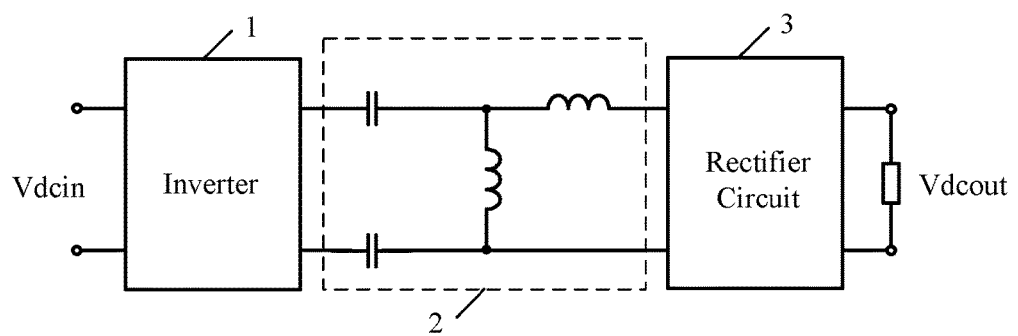
FIG. 1 is a schematic block diagram of an example DC-DC boost converter, in accordance with embodiments of the present invention.

Referring now to FIG. 1, shown is a schematic block diagram of an example DC-DC boost converter, in accordance with embodiments of the present invention. In this particular example, the DC-DC boost converter can include inverter 1, passive boost network 2, and rectifier circuit 3 coupled in sequence. The inverter can generate an AC power signal with a predetermined frequency. Passive boost network 2 can boost and output the AC power signal with a predetermined frequency. The boosted AC power signal output by passive boost network 2 may have the same frequency but different amplitudes with respect to the input AC power signal. Rectifier circuit 3 can rectify the boosted AC power signal to a DC power signal. Thus, the output voltage of rectifier circuit 3 may be higher than the DC input voltage. As such, the boost conversion can be realized by converting DC input voltage Vdacin to an AC power signal, and then boosting and rectifying to DC power signal Vdcout.

Figure 2:
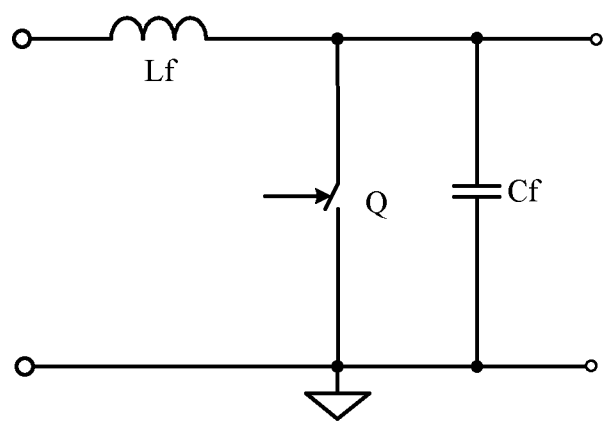
FIG. 2 is a schematic block diagram of an example inverter, in accordance with embodiments of the present invention.

Referring now to FIG. 2, shown is a schematic block diagram of an example inverter, in accordance with embodiments of the present invention. Inverter 1 can be implemented by various types of inverters, such as a half-bridge inverter or a full-bridge inverter. In this particular example, the E-type inverter can include inductor Lf, switch Q, and capacitor Cf. Inductor Lf can connect between the input terminal and the output terminal, and switch Q and capacitor Cf can be coupled in parallel between the output terminal and the reference terminal. When switch Q is turned on, the input terminal can charge inductor Lf, the current flowing through inductor Lf may linearly increase, and the output voltage can equal to the value across capacitor Cf. When switch Q is turned off, inductor Lf and capacitor Cf may form a resonant circuit, in order to output an AC power signal.

Figure 3:
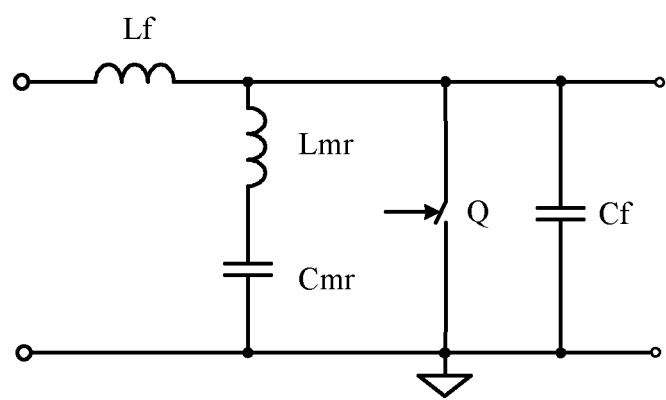
FIG. 3 is a schematic block diagram of another example inverter, in accordance with embodiments of the present invention.

Referring now to FIG. 3, shown is a schematic block diagram of another example inverter, in accordance with embodiments of the present invention. In this particular example, the Φ-type inverter may add a resonant circuit that can include inductor Lmr and capacitor Cmr coupled in series on the basis of the E-type inverter. The resonant circuit, switch Q, and capacitor Cf can be coupled in parallel, in order to enhance the voltage/current oscillation due to the turn off of switch Q.

Figure 4:
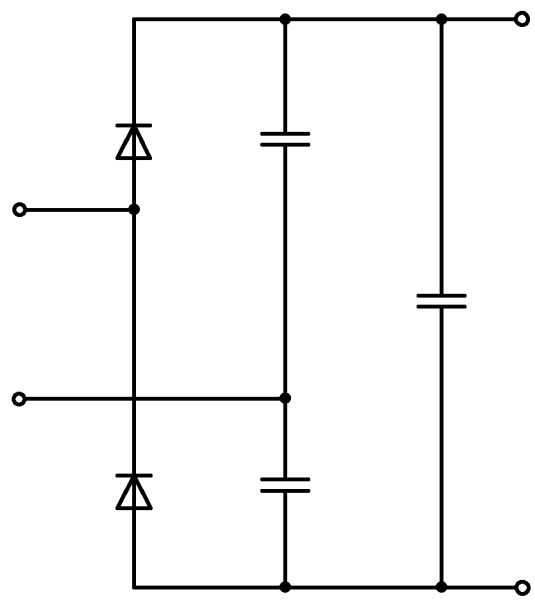
FIG. 4 is a schematic block diagram of an example rectifier circuit, in accordance with embodiments of the present invention.
Figure 5:
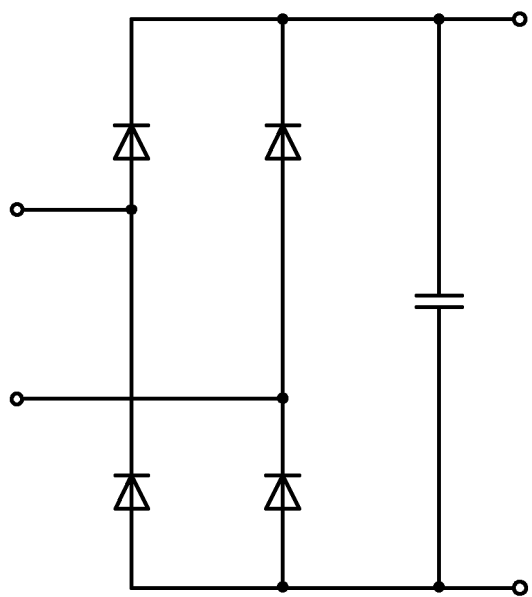
FIG. 5 is a schematic block diagram of another example rectifier circuit, in accordance with embodiments of the present invention.

Referring now to FIGS. 4 and 5, shown are schematic block diagrams of example rectifier circuits, in accordance with embodiments of the present invention. The rectifier circuit can be implemented by various rectifier circuit structures, such as the half-bridge rectifier circuit as shown in FIG. 4, and the full-bridge rectifier circuit as shown in FIG. 5. For example, the rectifier circuit can be implemented by replacing the controllable switches with the diodes in FIGS. 4 and 5, in order to realize synchronous rectification via the control circuit.

Figure 6:
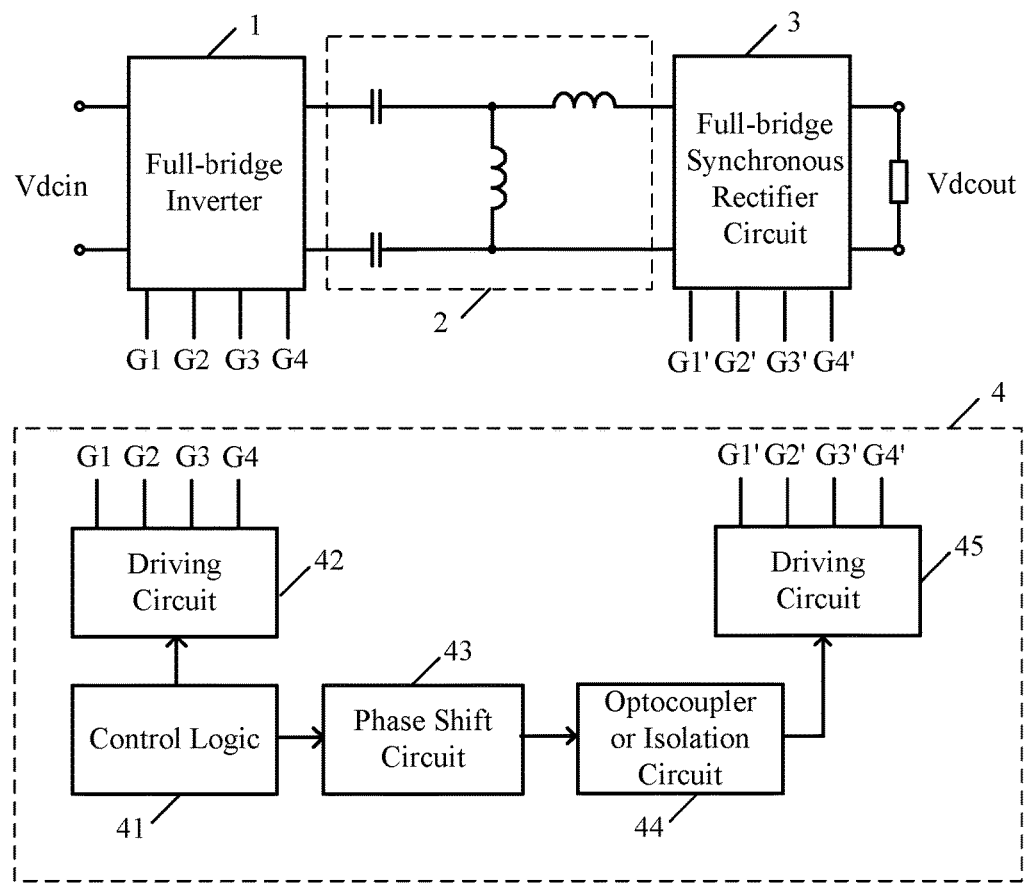
FIG. 6 is a schematic block diagram of an example DC-DC boost converter, in accordance with embodiments of the present invention.

Referring now to FIG. 6, shown is a schematic block diagram of an example DC-DC boost converter, in accordance with embodiments of the present invention. In this particular example, full-bridge inverter 1 and full-bridge synchronous rectifier circuit 3 can be utilized for inversion and rectification. Full-bridge inverter 1 can invert according to inverter control signals G1-G4 output by control circuit 4, and full-bridge synchronous rectifier circuit 3 may synchronously rectify according to rectification control signals G1'-G4' output by control circuit 4.

Control circuit 4 may include control logic 41, driving circuit 42 for outputting inverter control signals, phase shift circuit 43, optocoupler or isolation circuit 44, and driving circuit 45 for generating rectification control signals. Optocoupler or isolation circuit 44 can isolate the control signals of the inverter and the rectifier circuit, in order to ensure the safety of the circuitry. The inverter control signals and the rectification control signals can be maintained in synchronization through phase shift circuit 43, in order to ensure accurate operation of the inverter and rectification. In some cases, the inverter control signals and rectification control signals can be in phase, in order to eliminate the phase shift circuit.

Figure 7:
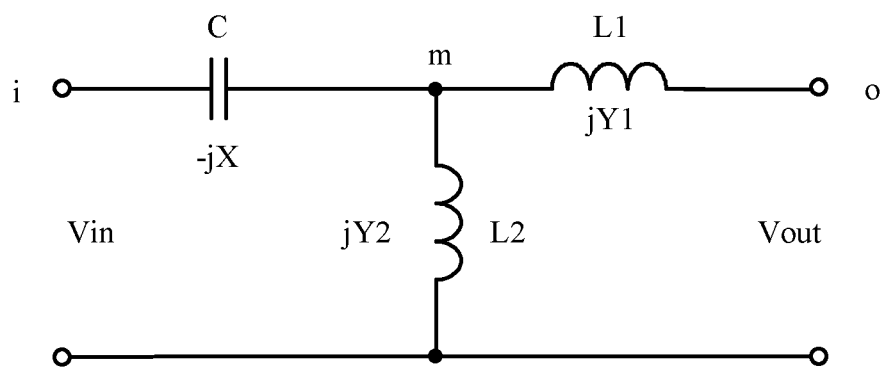
FIG. 7 is a schematic block diagram of an example passive boost network, in accordance with embodiments of the present invention.

Referring now to FIG. 7, shown is a schematic block diagram of an example passive boost network, in accordance with embodiments of the present invention. In this particular example, the passive boost network can include capacitor C, inductor L1, and inductor L2. This structure may form a "T" shaped network such that capacitor C and inductor L2 are coupled in series between the two terminals of the input port, while inductors L1 and L2 are coupled in series between the two terminals of the output port. For example, capacitor C can connect between terminal i of the input port and intermediate terminal m. Inductor L1 can connect between intermediate terminal m and terminal o of the output port. Inductor L2 can connect between intermediate terminal m and a second terminal of the input port. Also, the second terminals of the input port and the output port can be connected to each other.

When performing AC boost, the boost ratio is expected to be independent of load. According to Thevenin's theorem, a passive boost network and its input can be equivalent to a series circuit of voltage source Voc and equivalent output impedance Req. When equivalent output impedance Req is zero, the passive boost network and its input are equivalent to a voltage source Voc, thereby making the boost ratio independent of the load. For the passive boost network shown in FIG. 7, the impedance of capacitor C is $-jX$, where $X=1/\omega C$, the impedance of inductor L1 is $jY1$, where $Y1=\omega L1$, and the impedance of inductor L2 is $jY2$, where $Y2=\omega L2$. Thus, in order to make equivalent output impedance Req=0, X, Y1, and Y2 should satisfy:

$$X = \frac{Y1 \cdot Y2}{Y1 + Y2}$$

The parameters of capacitor C and inductors L1 and L2 should satisfy:

$$\frac{1}{\omega C} = \frac{\omega \cdot L1 \cdot L2}{L1 + L2}$$

In this equation, $\omega$ is the angular frequency of the AC power signal, C is the capacitance value of capacitor C, L1 is the inductance value of inductor L1, and L2 is the inductance value of inductor L2.

Figure 8:
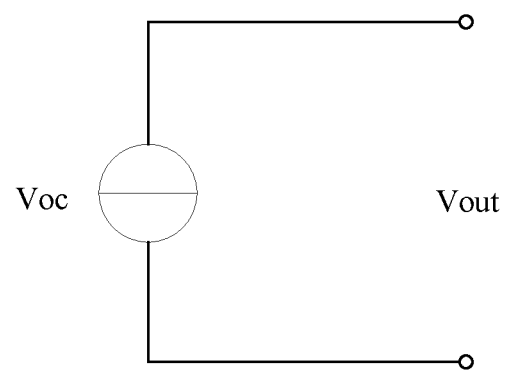
FIG. 8 is a schematic block diagram of an example equivalent circuit of a passive boost network, in accordance with embodiments of the present invention.

Referring now to FIG. 8, shown is a schematic block diagram of an example equivalent circuit of a passive boost network, in accordance with embodiments of the present invention. Req=0 when X, Y1, and Y2 satisfy the above condition. Therefore, the Thevenin equivalent circuit of the passive boost network of this particular example includes only voltage source Voc. The output voltage of voltage source Voc is the open circuit voltage of the passive boost network. That is, the voltage drop of the series circuit composed of capacitor C and inductor L2 at inductor L2, can satisfy the equations:

$$Voc = Vout = \left(1 + \frac{Y1}{Y2}\right)Vin, \text{ and } \frac{Vout}{Vin} = 1 + \frac{Y1}{Y2}$$

As such, for the passive boost network of particular embodiments, the ratio of the output voltage to the input voltage (i.e., the boosting ratio) can be set by the component parameters independently of the load, and may be adjusted by the parameters of Y1 and Y2. In order to isolate the input port and the output port, capacitor C can be divided into two capacitors C1 and C2, which may be respectively disposed on two branches coupled to the input port.

Figure 9:
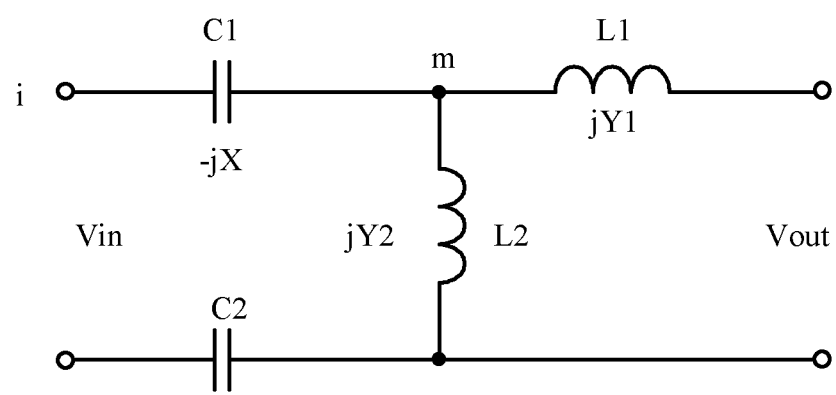
FIG. 9 is schematic block diagram of another example passive boost network, in accordance with embodiments of the present invention.

Referring now to FIG. 9, shown is schematic block diagram of another example passive boost network, in accordance with embodiments of the present invention. In this particular example, the passive boost network can include capacitors C1 and C2, and inductors L1 and L2. Inductors L1 and L2 can be coupled in series between the two terminals of the output port. Capacitor C1, inductor L2, and capacitor C2 can be serially coupled in sequence between the two terminals of the input port. Capacitor C1 can connect between terminal i of the input port and intermediate terminal m, and capacitor C2 can connect between the second terminals of the input port and the output port. As a result, there can be a capacitive isolation between any two terminals of the input and output ports. Since capacitors C1 and C2 are coupled in series, they can be equivalent to a capacitor with a capacitance value of C, which may satisfy:

$$C = \frac{C1 \cdot C2}{C1 + C2}$$

In the above equation, C1 and C2 are the capacitance values of capacitors C1 and C2, respectively. Also, the capacitance value of the above equivalent capacitor may satisfy:

$$\frac{1}{\omega C} = \frac{\omega \cdot L1 \cdot L2}{L1 + L2}$$

In this way, the equivalent output impedance of the passive boost network shown in FIG. 9 can be zero, such that the boost ratio of the passive boost network may only be related to the inductance values of inductor L1 and L2. Therefore, the passive boost network in this example can realize a boosting operation that is independent of the load parameter by setting the parameters of capacitors C1 and C2 and inductors L1 and L2 to ensure isolation between the input and output ports. For example, the capacitance values of capacitors C1 and C2 may be the same; that is, the capacitance values C1=C2=Cx of capacitors C1 and C2 may satisfy:

$$\frac{2}{\omega Cx} = \frac{\omega \cdot L1 \cdot L2}{L1 + L2}$$

This can allow the capacitance values to be adjusted relatively easily during design and configuration. The passive boost network example as shown in shown in FIGS. 7 and 9 may not only can realize the load-independent boost conversion, but also the phase of the output current may lag behind the voltage because the input resistance can be shown as an inductive load. In this way, zero voltage switch (ZVS) of the switches of the inverter can be achieved, and losses can be reduced as compared to other approaches.

Figure 10:
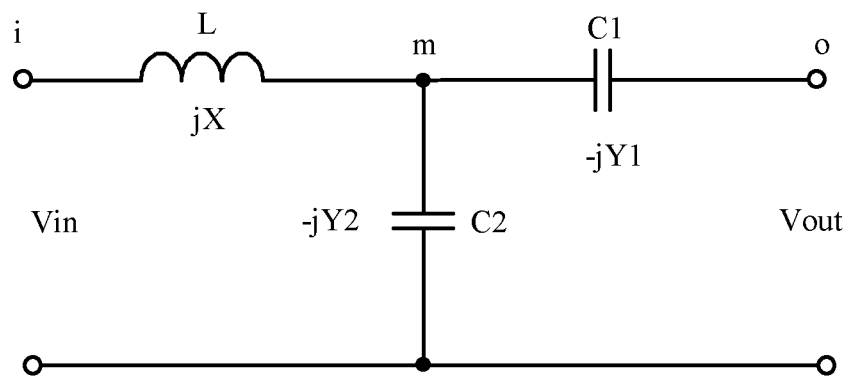
FIG. 10 is a schematic block diagram of yet another example passive boost network, in accordance with embodiments of the present invention.

Referring now to FIG. 10, shown is a schematic block diagram of yet another example passive boost network, in accordance with embodiments of the present invention. In this particular example, the passive boost network can include inductor L, capacitor C1, and capacitor C2. This structure may form a "T" shaped network such that inductor L and capacitor C2 are coupled in series between the two terminals of the input port, while capacitors C1 and C2 are coupled in series between the two terminals of the output port. For example, inductor L can connect between terminal i of the input port and intermediate terminal m. Capacitor C1 can connect between intermediate terminal m and terminal o of the output port. Capacitor C2 can connect between intermediate terminal m and the second terminal of the input port. Also, the second terminals of the input and output ports can be connected to each other.

When performing an AC boost, the boost ratio can be expected to be independent of the load. According to Thevenin's theorem, a passive boost network and its input can be equivalent to a series circuit of voltage source Voc and equivalent output impedance Req. When equivalent output impedance Req is zero, the passive boost network and its input are equivalent to voltage source Voc, thereby making the boost ratio independent of the load. For the passive boost network example as shown in FIG. 10, the impedance of inductor L is jX, where X=ωL, the impedance of capacitor C1 is −jY1, where Y1=1/ωC1, and the impedance of capacitor C2 is −jY2 where Y2=1/ωC2. Thus, in order to make equivalent output impedance Req=0, X, Y1, and Y2 may satisfy:

$$X = \frac{Y1 \cdot Y2}{Y1 + Y2}$$

The parameters of inductor L, capacitors C1 and C2 may satisfy:

$$\frac{1}{\omega(C1 + C2)} = \omega \cdot L$$

In the above equation, ω is the angular frequency of the AC power signal, L is the inductor value of inductor L, C1 is the capacitance value of capacitor C1, and C2 is the capacitance value of capacitor C2. When the parameters of the circuit components satisfy the above relationship, the output voltage and the input voltage of the passive boost network shown in FIG. 10 may satisfy:

$$\frac{Vout}{Vin} = 1 + \frac{Y1}{Y2}$$

That is to say, for the passive boost network in particular embodiments, the ratio of the output voltage to the input voltage (i.e., the boosting ratio) can be set by the component parameters independently of the load, and may be adjusted by the parameters of Y1 and Y2. In order to isolate the input port and the output port, capacitor C1 can be divided into two capacitors C11 and C12, which may be respectively disposed on two branches coupled to the output port.

Figure 11:
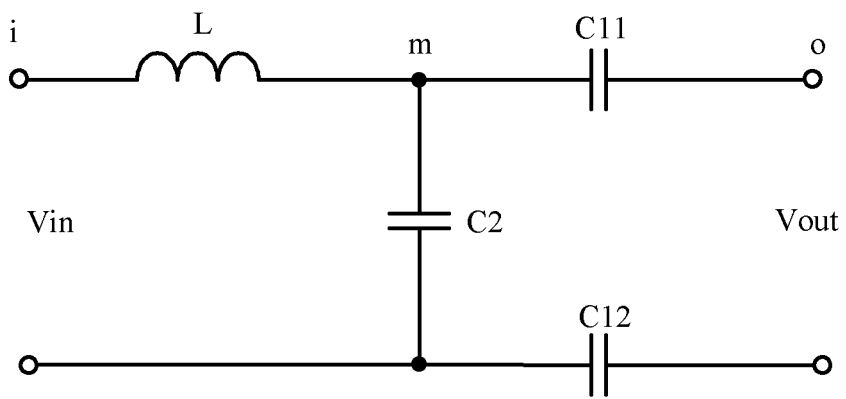
FIG. 11 is a schematic block diagram of still yet another example passive boost network, in accordance with embodiments of the present invention.

Referring now to FIG. 11, shown is a schematic block diagram of still yet another example passive boost network, in accordance with embodiments of the present invention. In this particular example, the passive boost network can include inductor L, capacitors C11, C12 and C2. Inductor L and capacitor C may be coupled in series between two terminals of the input port. Capacitors C11, C2, and C12 can be serially coupled in sequence between two terminals of the output port. Capacitor C11 can connect between the intermediate terminal m and terminal o of the output port. Capacitor C2 can connect between the intermediate terminal m and the second terminal of the input port. Also, capacitor C12 can connect between the second terminals of the input terminal and the output terminal. As a result, there can be capacitive isolation between any two terminals of the input and output ports. Because capacitors C11 and C12 are coupled in series in this example, they can be equivalent to a capacitor with a capacitance value of C1, which may satisfy:

$$C1 = \frac{C11 \cdot C12}{C11 + C12}$$

In the above equation, C11 and C12 are the capacitance values of capacitors C11 and C12, respectively. Also, the capacitance value of the above equivalent capacitor may satisfy:

$$\frac{1}{\omega(C1+C2)} = \omega \cdot L$$

In this way, the equivalent output impedance of the passive boost network shown in FIG. 11 may be zero, such that the boost ratio of the passive boost network is only related to the capacitance values of capacitors C11, C12 and C2. Therefore, the passive boost network in this example can realize a boosting operation independent of the load parameter by setting the parameters of capacitors C11, C12, C2 and inductor L in order to ensure isolation between the input and output ports. For example, the capacitance values of capacitors C11 and C12 may be the same; that is, the capacitance values C11=C12=Cx of capacitors C11 and C12 may satisfy:

$$\frac{1}{\omega(Cx/2+C2)} = \omega \cdot L$$

This setting can allow the capacitance values to be adjusted relatively easily during design and adjustment and/or configuration. Therefore, voltage boosting conversion in particular embodiments can be achieved by converting a DC input voltage to an AC power signal with a predetermined frequency, boosting the AC power signal by a passive boost network including an inductor and a capacitor, and then by rectifying the boosted AC power signal to a DC power signal. Also, the passive boost network in particular embodiments can effectively achieve the isolation between the input and output ports by setting capacitors in the input path or the output path, in order to provide an isolated DC-DC boost conversion without using a transformer. As a result, the volume of the power supply can be significantly reduced, while also guaranteeing the safety of the power supply circuit.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A passive boost network configured to boost and output an AC power signal having a predetermined frequency, the passive boost network comprising:
   a) an input port;
   b) an output port configured to provide said AC power signal;
   c) first and second passive components coupled in series between first and second terminals of said input port;
   d) a third passive component coupled in series with said second passive component between first and second terminals of said output port; and
   e) wherein said first passive component is a capacitor, and said second and third passive components are each an inductor, wherein the parameters of said first, second, and third passive components are predetermined such that an output impedance of said passive boost network is zero, and wherein the parameters of said first, second, and third passive components satisfy:

$$\frac{1}{\omega C} = \frac{\omega \cdot L1 \cdot L2}{L1 + L2}$$

wherein ω is an angular frequency of said AC power signal, C is a capacitance value of said first passive component, L1 is an inductance value of said third passive component, and L2 is an inductance value of said second passive component.

2. The passive boost network of claim 1, wherein:
   a) said first passive component is coupled between a first terminal of said input port and an intermediate terminal;
   b) said second passive component is coupled between said intermediate terminal and a second terminal of said output port;
   c) said third passive component is coupled between said intermediate terminal and a first terminal of said output port; and
   d) said second terminal of said output port is coupled to a second terminal of said input port.

3. The passive boost network of claim 1, further comprising:
   a) a fourth passive component coupled in series with said first and second passive components between said first and second terminals of said input port, wherein said fourth passive component is a capacitor; and
   b) wherein said first passive component is coupled between a first terminal of said input port and an intermediate terminal, said fourth passive component is coupled between a second terminal of said input port and a second terminal of said output port, said second passive component is coupled between said intermediate terminal and said second terminal of said output port, and said third passive component is coupled between said intermediate terminal and said first terminal of said output port.

4. The passive boost network of claim 3, wherein the parameters of said first, second, third, and fourth passive components are predetermined such that an output impedance of said passive boost network is zero.

5. The passive boost network of claim 4, wherein said parameters of said first, second, third, and fourth passive components satisfy:

$$\frac{2}{\omega Cx} = \frac{\omega \cdot L1 \cdot L2}{L1 + L2}$$

wherein ω is an angular frequency of said AC power signal, Cx are capacitance values of said first and fourth passive components, L1 is an inductance value of said third passive component, and L2 is an inductance value of said second passive component.

6. A DC-DC boost converter, comprising the passive boost network of claim 1, and further comprising:
   a) an inverter configured to generate said AC power signal with said predetermined frequency; and
   b) a rectifier circuit configured to convert said AC power signal to a DC voltage signal.

7. A passive boost network configured to boost and output an AC power signal having a predetermined frequency, the passive boost network comprising:
   a) an input port;
   b) an output port configured to provide said AC power signal;

c) first and second passive components coupled in series between first and second terminals of said input port;
d) a third passive component coupled in series with said second passive component between first and second terminals of said output port; and
e) wherein said first passive component is an inductor, and said second and third passive components are each a capacitor, wherein the parameters of said first, second, and third passive components are predetermined such that an output impedance of said passive boost network is zero, and wherein, and the parameters of said first, second, and third passive components satisfy:

$$\frac{1}{\omega(C1+C2)} = \omega \cdot L$$

wherein $\omega$ is an angular frequency of said AC power signal, L is an inductance value of said first passive component, C1 is a capacitance value of said third passive component, and C2 is a capacitance value of said second passive component.

8. The passive boost network of claim 7, wherein:
a) said first passive component is coupled between a first terminal of said input port and an intermediate terminal;
b) said second passive component is coupled between said intermediate terminal and a second terminal of said output port;
c) said third passive component is coupled between said intermediate terminal and a first terminal of said output port; and
d) said second terminal of said output port is coupled to a second terminal of said input port.

9. The passive boost network of claim 7, further comprising:
a) a fourth passive component coupled in series with said third and second passive components between said first and second terminals of said output port, wherein said fourth passive component is an inductor; and
b) wherein said first passive component is coupled between a first terminal of said input port and an intermediate terminal, said second passive component is coupled between said intermediate terminal and a second terminal of said input port, said third passive component is coupled between said intermediate terminal and a first terminal of said output port, and said fourth passive component is coupled between said second terminal of said input port and said second terminal of said output port.

10. The passive boost network of claim 9, wherein the parameters of said first, second, third, and fourth passive components are predetermined such that an output impedance of said passive boost network is zero.

11. The passive boost network of claim 10, wherein said parameters of said first, second, third, and fourth passive components satisfy:

$$\frac{1}{\omega(Cx/2+C2)} = \omega \cdot L$$

wherein $\omega$ is an angular frequency of said AC power signal, L is an inductance value of said first passive component, Cx are capacitance values of said third passive component and said fourth passive component, and C2 is a capacitance value of said second passive component.

12. A DC-DC boost converter, comprising the passive boost network of claim 7, and further comprising:
a) an inverter configured to generate said AC power signal with said predetermined frequency; and
b) a rectifier circuit configured to convert said AC power signal to a DC voltage signal.

13. A passive boost network configured to boost and output an AC power signal having a predetermined frequency, the passive boost network comprising:
a) an input port;
b) an output port configured to provide said AC power signal;
c) first and second passive components coupled in series between first and second terminals of said input port;
d) a third passive component coupled in series with said second passive component between first and second terminals of said output port;
e) a fourth passive component coupled in series with said first and second passive components between said first and second terminals of said input port, wherein said first and fourth passive components are each a capacitor, and said second and third passive components are each an inductor;
f) wherein said first passive component is coupled between a first terminal of said input port and an intermediate terminal, said fourth passive component is coupled between a second terminal of said input port and a second terminal of said output port, said second passive component is coupled between said intermediate terminal and said second terminal of said output port, and said third passive component is coupled between said intermediate terminal and said first terminal of said output port; and
g) wherein the parameters of said first, second, third, and fourth passive components are predetermined such that an output impedance of said passive boost network is zero, wherein said parameters of said first, second, third, and fourth passive components satisfy:

$$\frac{2}{\omega Cx} = \frac{\omega \cdot L1 \cdot L2}{L1+L2}$$

wherein $\omega$ is an angular frequency of said AC power signal, Cx are capacitance values of said first and fourth passive components, L1 is an inductance value of said third passive component, and L2 is an inductance value of said second passive component.

14. A DC-DC boost converter, comprising the passive boost network of claim 13, and further comprising:
a) an inverter configured to generate said AC power signal with said predetermined frequency; and
b) a rectifier circuit configured to convert said AC power signal to a DC voltage signal.

* * * * *